(12) United States Patent
Russalian

(10) Patent No.: US 9,206,861 B2
(45) Date of Patent: Dec. 8, 2015

(54) INTEGRATED SWITCHABLE SHAFT BEARING

(71) Applicant: Schaeffler Technologies GmbH & Co. KG, Herzogenaurach (DE)

(72) Inventor: Vigel Russalian, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/335,034

(22) Filed: Jul. 18, 2014

(65) Prior Publication Data

US 2015/0027843 A1 Jan. 29, 2015

Related U.S. Application Data

(60) Provisional application No. 61/858,792, filed on Jul. 26, 2013.

(51) Int. Cl.
| | | |
|---|---|---|
| *F16D 15/00* | (2006.01) | |
| *F16D 27/102* | (2006.01) | |
| *F16C 41/00* | (2006.01) | |
| *F16D 11/16* | (2006.01) | |
| *F16D 27/10* | (2006.01) | |
| *F16D 23/12* | (2006.01) | |
| *F16D 7/00* | (2006.01) | |

(52) U.S. Cl.
CPC ............... *F16D 15/00* (2013.01); *F16C 41/001* (2013.01); *F16D 11/16* (2013.01); *F16D 27/10* (2013.01); *F16D 7/005* (2013.01); *F16D 27/102* (2013.01); *F16D 2023/123* (2013.01)

(58) Field of Classification Search
CPC ........ F16D 15/00; F16D 27/10; F16D 27/102

USPC .............................................. 192/93 C, 84.8
See application file for complete search history.

(56) References Cited

U.S. PATENT DOCUMENTS

| | | | | |
|---|---|---|---|---|
| 4,232,772 | A | * | 11/1980 | Brissey et al. ............ 192/114 R |
| 4,966,265 | A | | 10/1990 | Wiese et al. |
| 2007/0267269 | A1 | * | 11/2007 | Benoit et al. ................. 192/84.8 |
| 2011/0048390 | A1 | | 3/2011 | Washburn |

FOREIGN PATENT DOCUMENTS

| | | |
|---|---|---|
| DE | 98060 | 7/1898 |
| DE | 3830200 | 11/1989 |
| GB | 967863 | 8/1964 |
| GB | 2465999 | 6/2010 |

* cited by examiner

*Primary Examiner* — Richard Lorence
*Assistant Examiner* — David Morris
(74) *Attorney, Agent, or Firm* — Volpe and Koenig, P.C.

(57) ABSTRACT

An integrated switchable shaft bearing having an inner ring, a circumferentially extending clutch groove, and axially extending cam pin openings. An outer ring is located about the inner ring, and rolling elements are located therebetween. A clutch ring with clutch fingers is located in the clutch groove. Cam pins are located in pin openings and extend beneath the clutch fingers. An actuator moves the cam pins from an engaged position, where cam portions each engage a respective one of the clutch fingers forcing it outwardly above a race surface of the inner ring into engagement with the rolling elements to transfer torque from the outer ring to the inner ring, to a released position, in which cam pins are disengaged from the clutch fingers, which move beneath the race surface of the inner ring so that the outer ring is rotatable relative to the inner ring via the rolling elements.

14 Claims, 4 Drawing Sheets

US 9,206,861 B2

INTEGRATED SWITCHABLE SHAFT BEARING

INCORPORATION BY REFERENCE

The following documents are incorporated herein by reference as if fully set forth: U.S. Provisional Patent Application No. 61/858,792, filed Jul. 26, 2013.

FIELD OF INVENTION

The present invention relates to a switchable, torque transmitting bearing arrangement.

BACKGROUND

In automotive applications, there is a push for energy efficiency. As some auxiliary components for internal combustion engines in motor vehicles are not required to run at all times, there has been an increase in efforts to isolate these auxiliary components when not in use. In the past, these components were connected to the engine drive via belts or chain drives, and engaged irrespective of need during running of the internal combustion engine. This negatively affects the motor vehicle efficiency, particularly with respect to fuel consumption.

Additional efficiencies can be gained for example, by having a water pump which is inactive upon cold starting of an engine so that the engine can come up to the running temperature more quickly, which also increases efficiency. Systems for deactivating a water pump include a moveable cover which covers the vanes of the pump impeller when the water pump is not required. However, in such systems, the water pump is driven constantly by the chain or belt drive, but the coolant is not pumped through the cooling jackets of the engine due to the cover over the vanes of the impeller. Another known solution provides an electro-magnetic clutch between the bearing and the drive pulley for the water pump. However, this solution requires additional space and has a weight penalty. Further, many additional parts are required to achieve functionality. Additionally, the energy required for operation is comparatively high due to the method of operation adopted from conventional electro-magnetic/mechanical clutch systems.

It would be desirable to provide a clutching function for disconnecting auxiliary drive components when not needed, particularly in connection with internal combustion engines for motor vehicles, which has a small space requirement, low weight, and low cost.

SUMMARY

Briefly stated, an integrated switchable shaft bearing is provided comprising an inner ring having a race, a circumferentially extending clutch groove that intersects the race at least at one position, and axially extending cam pin openings. An outer ring having a race is located about the inner ring, and rolling elements are located in the races between the inner and outer rings. A clutch ring with clutch fingers is located in the clutch groove. The clutch fingers have adjacent spaces aligned with the pin openings. Cam pins are located in pin openings, with the cam pins each having a cam portion. An actuator is provided that moves the cam pins from an engaged position, in which the cam portions each engage a respective one of the clutch fingers and force the clutch fingers outwardly to a position above a race surface of the inner ring into engagement with the rolling elements so that torque is transferred from the outer ring to the inner ring, to a released position, in which the cam portions of the cam pins are disengaged from the clutch fingers, which move beneath the race surface of the inner ring so that the rolling elements are movable on the race of the inner ring so that the outer ring is rotatable relative to the inner ring via the rolling elements.

In a preferred aspect of the invention, the integrated switchable shaft bearing is used in connection with an auxiliary drive element of an internal combustion engine, such as a water pump, which can be switched off in order to allow faster heating of the engine from a cold start, and can then be switched on or off depending on the coolant temperature in order to save energy and reduce the load on the engine when not required.

In another aspect, the clutch fingers are elastically deflectable against a restoring force of a clutch finger material. In a preferred embodiment, the clutch ring and clutch fingers are made of spring steel.

In another aspect, it is preferred that the cam pins are connected to a cam pin plate, which is preferably ring-shaped. The cam pins preferably also include a step down from the cam portion so that when the cam pins are moved to the released position, the step portion of the cam pin still remains under the clutch fingers to avoid jams when the actuator moves the cam pins to the engaged position.

Preferably, the inner ring is connected to a shaft and the actuator includes a spring that acts against the cam pin plate to bias the cam pin plate to the engaged position. An electromagnet acts on the cam pin plate to move the cam pin plate with the associated cam pins to the released position. In a preferred embodiment, the shaft includes a step, and the spring is supported on the step on one end and against the cam pin plate on the other end so that the spring biases the cam pin plate to the engaged position and the electro-magnet is used to move the cam pin plate to the released position. It would also be possible to have the spring bias the cam pin plate to the released position and use the electro-magnet to hold the cam pin plate in the engaged position, depending upon the desired non-energized state for the electro-magnet.

One benefit of the actuator including electro-magnet is that the electro-magnet holds the cam pin plate in a fixed position, and the cam pins prevent rotation of the inner ring and thereby also prevent rotation of the attached shaft.

In a preferred arrangement, the shaft is part of an auxiliary drive that includes a housing, and the electro-magnet is mounted on the housing. One preferred application is for the auxiliary drive being a water pump. In this arrangement, preferably a drive pulley is located on the outer ring so that torque can be transmitted from a belt engaged with the crankshaft in order to drive the auxiliary drive.

In the preferred arrangement, the rolling elements are balls; however, other types of rolling elements could be used such as rollers. Preferably, the balls are held spaced apart in a cage. In the preferred embodiment, the inner ring, the outer ring, and the balls form a three point contact ball bearing.

In order to allow for ease of assembly, preferably the clutch ring includes at least one radially extending slot; however, it is also possible to provide alternative arrangements for installing a clutch ring in one or more pieces into the clutch slot located in the inner ring.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
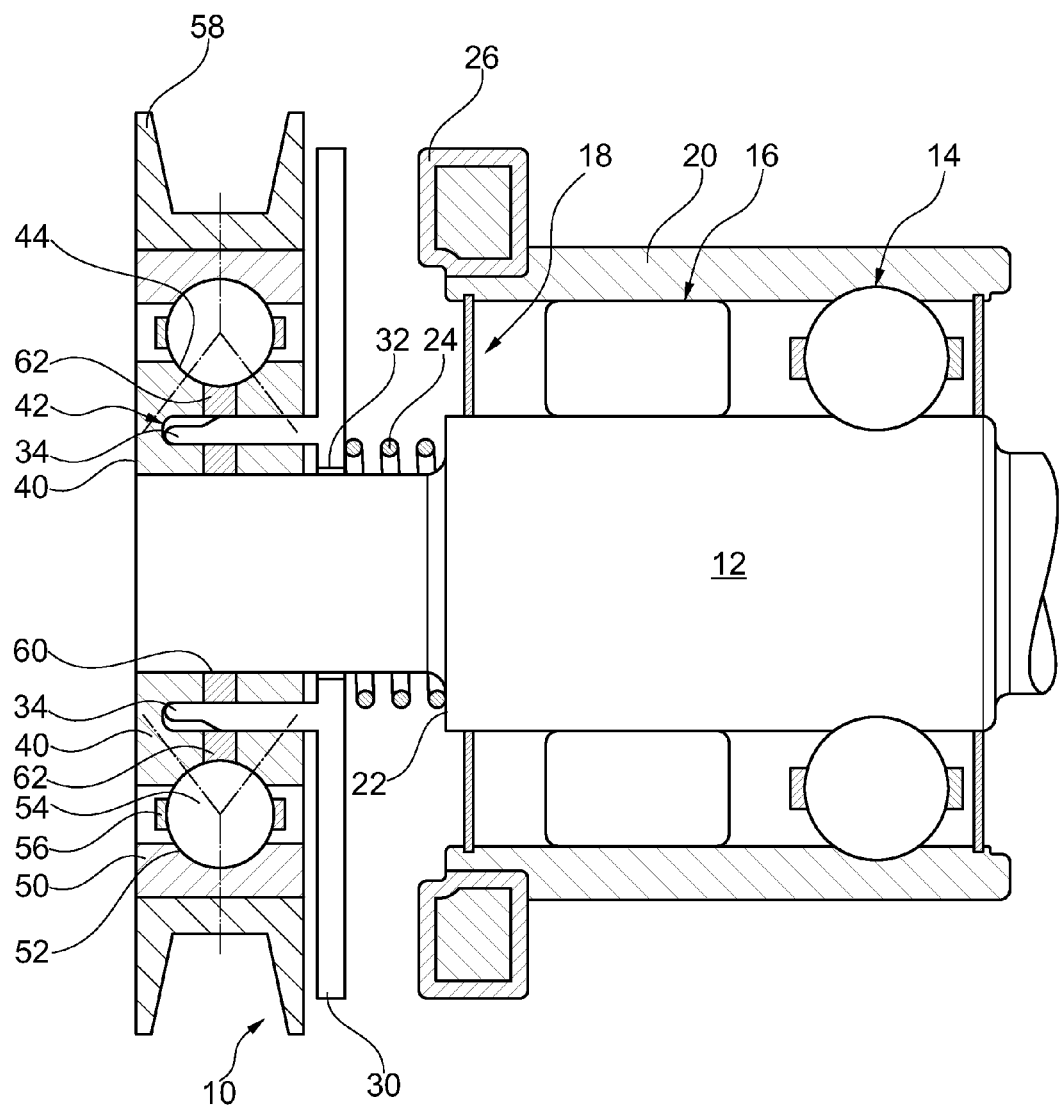
FIG. 1 is a cross-sectional view through an integrated switchable shaft bearing according to a preferred embodiment of the invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIG. 1, an integrated switchable shaft bearing 10 is shown in detail. The integrated switchable shaft bearing 10 is shown on a shaft 12 which is supported via rolling elements 14, 16 in a housing 20. A seal 18 can be provided between the shaft 12 and the housing 20 in order to contain lubricants and prevent the ingress of dirt, etc. An additional seal can be provided at the opposite end. The shaft 12 preferably has a shoulder 22.

The switchable shaft bearing 10 includes an inner ring 40 having a race 44, a circumferentially extending clutch groove 46 that intersects the race 44 at least at one position, as well as axially extending cam pin openings 42. An outer ring 50 is located about the inner ring 40 and also includes a race 52. Rolling elements 54, preferably in the form of balls, are located in the races 44, 52 between the inner ring 40 and the outer ring 50. Preferably, the rolling elements 54 are held spaced apart from one another via a cage 56. A pulley 58 or other type of drive element, such as a gear, is preferably located on the outer ring 50.

Figure 6:
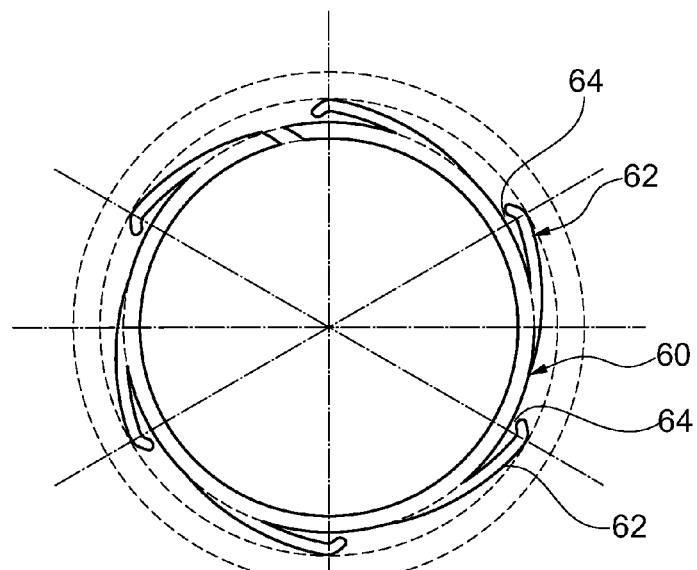
FIG. 6 is a detail view taken in an axial direction of the clutch ring.

Referring to FIGS. 1 and 6, a clutch ring 60 having clutch fingers 62 is located in the clutch groove 46 in the inner ring 40. The clutch fingers 62 have adjacent spaces 64 aligned with the cam pin openings 42 in the inner ring 40.

As shown in detail in FIGS. 1, 3, 5, and 9 to 12, cam pins 34 are located in the pin openings 42 in the inner ring 40. The cam pins 34 preferably include a cam portion 36 as well as a step 38. In the preferred embodiment, the cam pins 34 are connected to a cam pin plate 30, shown in detail in FIGS. 11 and 12. In a preferred embodiment, there are six cam pins 34 which are aligned and inserted through six cam pin openings 42 in the inner ring 40 in a position in which the cam pins 34 extend through the spaces beneath the clutch fingers 62 of the clutch ring 60. The clutch fingers 62 are elastically deflectable against a restoring force of the clutch finger material. Preferably, the clutch ring 60 is formed from spring steel.

Figures 2, 3:
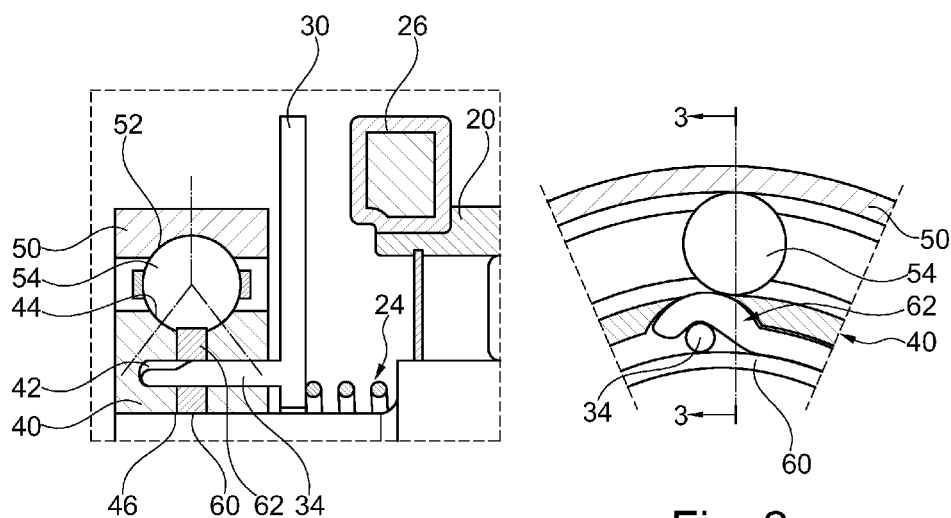
FIG. 2 is an enlarged view taken in an axial direction showing the outer ring, inner ring, rolling element and clutch with a clutch finger locking the inner ring to the outer ring in order to transmit torque.
FIG. 3 is a cross-sectional view taken along line 3-3 in FIG. 2.
Figures 4, 5:
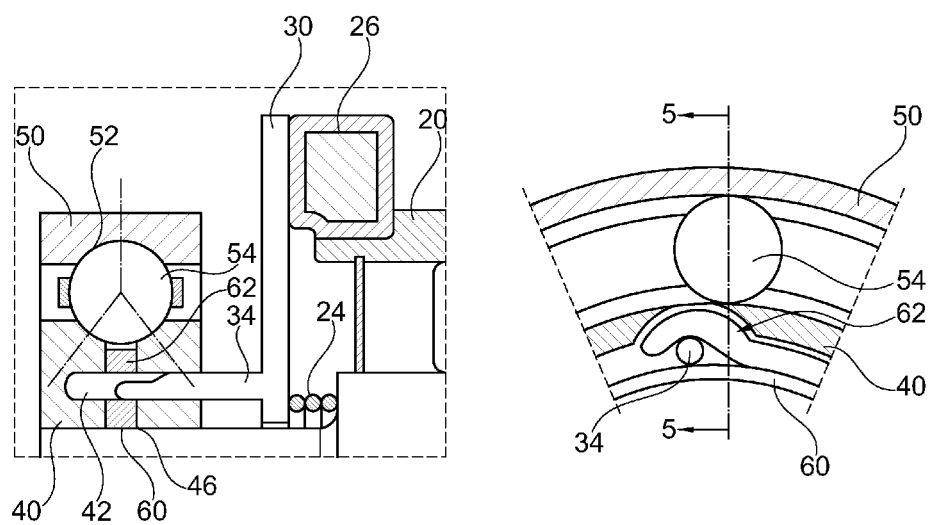
FIG. 4 is an enlarged cross-sectional view similar to FIG. 2 showing the clutch fingers on the clutch ring in a disengaged position so that the outer ring is rotatable relative to the inner ring via the rolling elements.
FIG. 5 is a cross-sectional view taken along line 5-5 in FIG. 4.

Referring again to FIG. 1, an actuator, preferably including an electro-magnet 26 and a spring 24, moves the cam pins 34 from an engaged position, shown in detail in FIGS. 2 and 3, in which the cam portions 36 each engage a respective one of the clutch fingers 62 and force the clutch fingers 62 outwardly to a position above a race surface of the inner ring 40 into engagement with the rolling elements 54. This allows torque to be transferred to the outer ring 50 to the inner ring 40. The actuator is movable to a released position in which the cam portions 36 of the cam pins 34 are disengaged from the clutch fingers 62, as shown in FIGS. 4 and 5. In this position, the clutch fingers 62 move beneath the race surface of the inner ring 40 so that the rolling elements 54 are movable on the race 44 of the inner ring 40 so that the outer ring 50 is rotatable relative to the inner ring 40 via the rolling elements 54, and no torque is transferred.

The inner ring 40 is preferably connected to the shaft 12, and the spring 24 of the actuator acts against the cam pin plate 30 to bias the cam pin plate 30 to the engaged position as shown in FIGS. 1-3. The electro-magnet 26, which is preferably mounted on the housing 20, is energized to act on the cam pin plate 30 against the force of the spring 24 to move the cam pin plate 30 so that the cam pins 34 are in the released position, as shown in FIGS. 4 and 5. When the power to the electro-magnet 26 is discontinued, the spring 24 acts on the cam pin plate 30 to return the cam pins 34 to the engaged position so that torque is transferred from the outer ring 50 to the inner ring 40 of the integrated switchable shaft bearing 10 so that, for example, a water pump in an internal combustion engine is driven.

Those skilled in the art will recognize that the actuator could be arranged so that the cam pins 34 are in the released position in the non-energized state of the electro-magnet 26 and are moved into the engaged position via energizing the electro-magnet 26.

An advantage of the cam pin plate 30 is that when the electro-magnet 26 is energized, the electro-magnet 26 holds the cam pin plate 30 in a fixed position, as shown in FIG. 5 and, since the cam pins 34 remain engaged in the pin openings 42 in the inner ring 40 which is located on the shaft 12, the cam pins 34 prevent rotation of the inner ring 40 as well as the shaft 12. In a preferred arrangement where the shaft 12 is a part of an auxiliary drive, such as a water pump in an internal combustion engine, the housing 20 is part of the water pump housing and the electro-magnet 26 is mounted to this housing 20.

Preferably, the rolling elements 54 are balls for a ball bearing and the inner ring 40, the outer ring 50, and the balls form a three point contact ball bearing. While balls are preferred, those skilled in the art will recognize that the rolling elements 54 can be rollers.

Figures 7, 8:
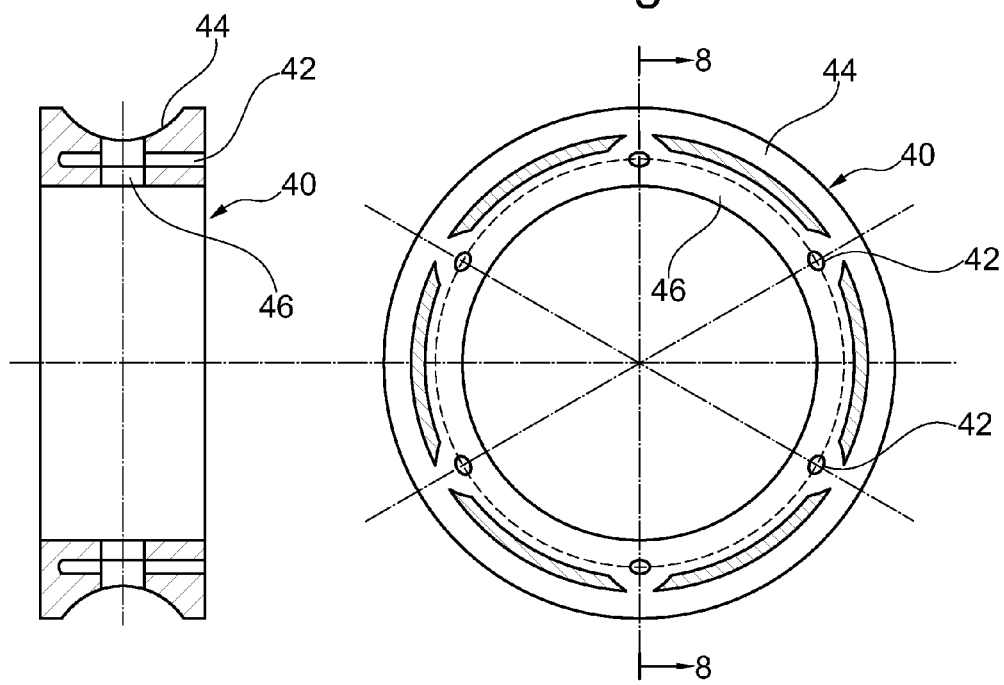
FIG. 7 is a detail view taken in the axial direction of the inner ring.
FIG. 8 is a cross-sectional view taken along 8-8 in FIG. 7.
Figures 9, 10:
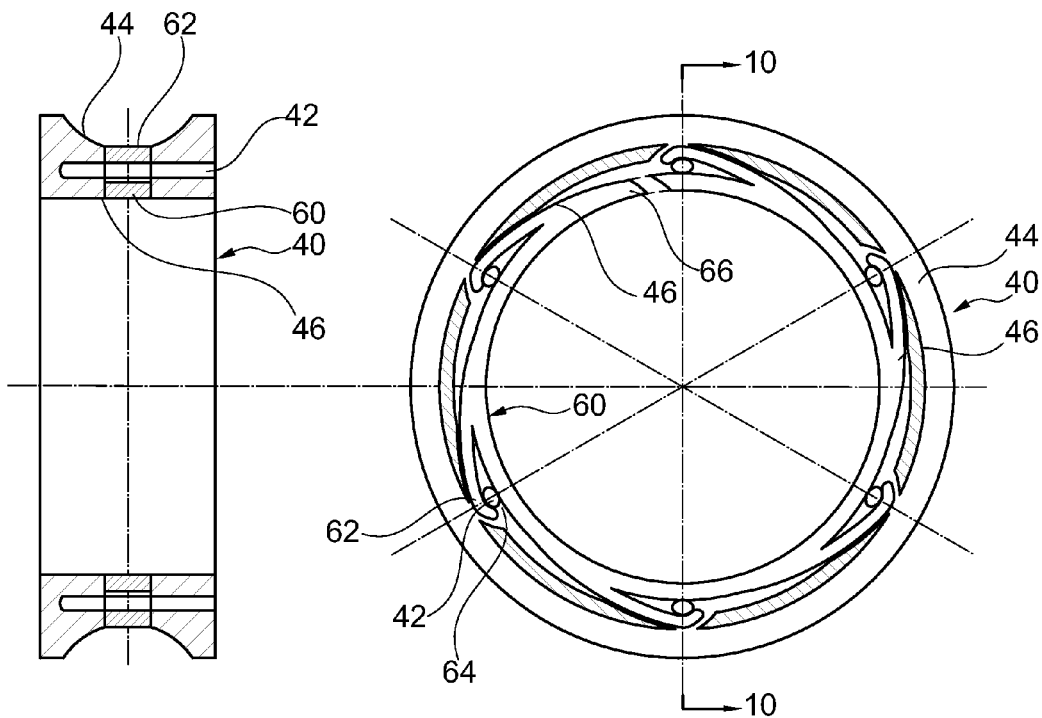
FIG. 9 is a detail view showing the clutch ring assembled in the clutch groove located in the inner ring.
FIG. 10 is a cross-sectional view taken along line 10-10 in FIG. 9.
Figures 11, 12:
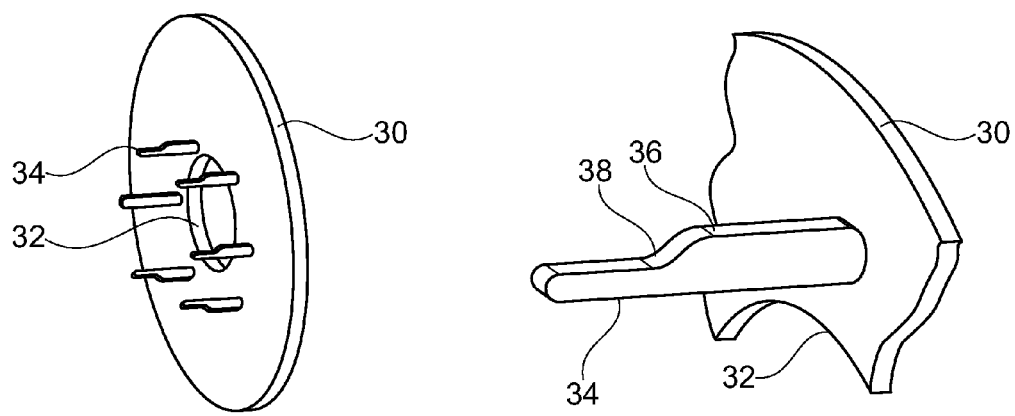
FIG. 11 is a detail perspective view showing the cam pin plate.
FIG. 12 is an enlarged partial view of the cam pin plate showing a profile of a preferred cam pin.

FIGS. 7 and 8 show the inner ring 40 in detail with the clutch groove 46 intersecting the race 44, at least in the areas above the pin openings 42. FIGS. 9 and 10 show the assembly of the clutch ring 60 with the inner ring 40. In order to allow installation of the clutch ring 60, a slot 66 is provided in the clutch ring 60 so that it can be collapsed to a smaller diameter and then expanded to position in the clutch groove 46. The clutch ring 60 is then locked in position via the cam pins 34 when the cam pin plate 30 is placed in the position.

While one preferred actuator arrangement uses the electro-magnet 26 which attracts the cam pin plate 30 in order to move the cam pins 34 to the released position, and the spring 24 which forces the cam pins 34 back into the engaged position when power to the electro-magnet 26 is turned off, those skilled in the art will recognize that other types of actuators can be used, such as a hydraulic actuator.

The integrated switchable shaft bearing 10 can be used in conjunction with various auxiliary drive elements of an internal combustion engine for a motor vehicle, such as an air conditioning compressor, a starter/generator, a water pump, or other components which do not need to run the entire time the internal combustion engine is running. Additionally, the integrated switchable shaft bearing 10 can be used in other applications.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An integrated switchable shaft bearing, comprising:
    an inner ring having a race, a circumferentially extending clutch groove that intersects the race at least at one position, and axially extending cam pin openings;
    an outer ring having a race;
    rolling elements located in the races between the inner and outer rings;
    a clutch ring with clutch fingers located in the clutch groove, the clutch fingers have adjacent spaces aligned with the pin openings;
    cam pins located in the pin openings, the cam pins each have a cam portion; and
    an actuator that moves the cam pins from an engaged position, in which the cam portions each engage a respective one of the clutch fingers and force the clutch fingers outwardly to a position above a race surface of the inner ring into engagement with the rolling elements so that torque is transferred from the outer ring to the inner ring, to a released position, in which the cam portions of the cam pins are disengaged from the clutch fingers, which move beneath the race surface of the inner ring so that the rolling elements are movable on the race of the inner ring so that the outer ring is rotatable relative to the inner ring via the rolling elements.

2. The integrated switchable shaft bearing of claim 1, wherein the clutch fingers are elastically deflectable against a restoring force of a clutch finger material.

3. The integrated switchable shaft bearing of claim 1, wherein the cam pins are connected to a cam pin plate.

4. The integrated switchable shaft bearing of claim 3, wherein the cam pins have a step down from the cam portion.

5. The integrated switchable shaft bearing of claim 3, wherein the inner ring is connected to a shaft, and the actuator includes a spring that acts against the cam pin plate to bias the cam pin plate to the engaged position, and an electro-magnet that acts on the cam pin plate to move the cam pin plate to the released position.

6. The integrated switchable shaft bearing of claim 5, wherein the shaft includes a step, and the spring is supported on the step on one end and against the cam pin plate on the other end.

7. The integrated switchable shaft bearing of claim 5, wherein the electro-magnet holds the cam pin plate in a fixed position, and the cam pins prevent rotation of the inner ring.

8. The integrated switchable shaft bearing of claim 5, wherein the shaft is a part of an auxiliary drive that includes a housing, and the electro-magnet is mounted on the housing.

9. The integrated switchable shaft bearing of claim 8, wherein the auxiliary drive is a water pump.

10. The integrated switchable shaft bearing of claim 1, wherein a drive pulley is located on the outer ring.

11. The integrated switchable shaft bearing of claim 1, wherein the rolling elements are balls.

12. The integrated switchable shaft bearing of claim 11, wherein the balls are held spaced apart in a cage.

13. The integrated switchable shaft bearing of claim 11, wherein the inner ring, the outer ring, and the balls form a 3 point contact ball bearing.

14. The integrated switchable shaft bearing of claim 1, wherein the clutch ring includes one radially extending slot.

* * * * *